US012123214B1

(12) United States Patent
Cai

(10) Patent No.: US 12,123,214 B1
(45) Date of Patent: Oct. 22, 2024

(54) SUPPORT DEVICE AND OUTDOOR APPLIANCE

(71) Applicant: Qinglin Cai, Nanping (CN)

(72) Inventor: Qinglin Cai, Nanping (CN)

( * ) Notice: Subject to any disclaimer, the term of this patent is extended or adjusted under 35 U.S.C. 154(b) by 0 days.

(21) Appl. No.: 18/650,787

(22) Filed: Apr. 30, 2024

(51) Int. Cl.
*E04H 15/44* (2006.01)
*A45F 3/44* (2006.01)
*F16M 13/00* (2006.01)

(52) U.S. Cl.
CPC .............. *E04H 15/44* (2013.01); *A45F 3/44* (2013.01); *F16M 13/005* (2013.01)

(58) Field of Classification Search
CPC ....... E04H 15/44; E04H 15/60; E04H 15/005; A45B 2023/0012; A45F 3/44
USPC .................................................. 248/156, 530
See application file for complete search history.

(56) References Cited

U.S. PATENT DOCUMENTS

| | | | | |
|---|---|---|---|---|
| 866,335 A * | 9/1907 | Cook | ...................... | E04H 15/60 135/121 |
| 2,690,211 A * | 9/1954 | Wentz | ...................... | A47C 9/10 248/155.1 |
| 3,866,619 A * | 2/1975 | Per Frisk | ................ | E04H 15/60 135/65 |
| 5,683,199 A * | 11/1997 | Tehan | ...................... | A43C 9/06 403/291 |
| 6,702,239 B2 * | 3/2004 | Boucher | ................ | A01G 17/04 248/230.8 |
| 6,925,754 B1 * | 8/2005 | Tearoe | ...................... | A01G 9/12 172/371 |
| 7,406,977 B1 * | 8/2008 | Shires | ...................... | E04H 15/26 135/121 |
| 9,051,756 B1 * | 6/2015 | Jenkins | ................... | E04H 15/58 |
| 9,903,134 B2 * | 2/2018 | Munnerlyn | ........... | E04H 15/001 |
| 11,473,332 B2 * | 10/2022 | Baranski | ................ | E04H 15/44 |
| 11,686,120 B1 * | 6/2023 | Yates | ...................... | E04H 15/44 135/143 |
| 2022/0178164 A1 * | 6/2022 | Baranski | ................ | E04H 15/44 |

FOREIGN PATENT DOCUMENTS

FR 958426 A * 3/1950

* cited by examiner

*Primary Examiner* — Noah Chandler Hawk

(57) ABSTRACT

A support device and an outdoor appliance. The support device includes a support rod, a pedal member, and an elastic rope. The support rod includes sleeve rods disposed sequentially from top to bottom; for each adjacent two sleeve rods, an end portion of one of the adjacent two is configured to be socked and mated with an end portion of the other; a peripheral wall of a bottom sleeve rod defines an avoidance hole and a socket hole. The pedal member is configured to be socked and mated with the socket hole and protruding from the peripheral wall. The elastic rope is disposed within the bottom sleeve rod and sequentially threaded through some sleeve rods; a lower end of the elastic rope is threaded out of the avoidance hole and fixed to the pedal member, and an upper end of the elastic rope is connected to another sleeve rod.

16 Claims, 14 Drawing Sheets

SUPPORT DEVICE AND OUTDOOR APPLIANCE

TECHNICAL FIELD

The present disclosure relates to the technical field of outdoor appliances, and more specifically to a support device and an outdoor appliance.

BACKGROUND

Outdoor appliances, such as tents or canopies, are required to be supported for use, which therefore needs that a support device for supporting the outdoor appliance is sufficiently solid. In particular, the weather is hotter in the summer, and shade tents are preferred by people for traveling due to their good ventilation. However, since there is more windy weather in the summer, the difficulty of reinforcing the support device is further exacerbated. Further, when encountering harder soil, the support device is more difficult to be inserted into the ground, such that the insertion depth thereof is often insufficient, resulting in the tent being easily blown down.

SUMMARY OF THE DISCLOSURE

The main purpose of the present disclosure is to propose a support device and an outdoor appliance to reduce the difficulty of reinforcing the support device.

To achieve the above purpose, the present disclosure provides a support device, including: a support rod, including a plurality of sleeve rods disposed sequentially in a top-to-bottom direction; wherein for each adjacent two of the plurality of sleeve rods, an end portion of one of the adjacent two is configured to be socked and mated with an end portion of the other of the adjacent two; a peripheral wall of one of the plurality of sleeve rods located at a bottom defines an avoidance hole and a socket hole; a pedal member, configured to be socked and mated with the socket hole and protruding from the peripheral wall of the one of the plurality of sleeve rods located at the bottom; and an elastic rope, disposed within the one of the plurality of sleeve rods located at the bottom, and sequentially threaded through some of the plurality of sleeve rods; wherein a lower end of the elastic rope is threaded out of the avoidance hole and fixed to the pedal member, and an upper end of the elastic rope is connected to another of the some of the plurality of sleeve rods.

In some embodiments, the pedal member defines a threading hole, and the lower end of the elastic rope is threaded through the threading hole.

In some embodiments, the socket hole includes two socket holes, and the two socket holes are aligned along a radial direction of the one of the plurality of sleeve rods located at the bottom; and/or the pedal member is a cylindrical insert to fit into the socket hole with a gap between the pedal member and the socket hole.

In some embodiments, an aperture of the avoidance hole is less than an aperture of the socket hole and less than a diameter of the pedal member.

In some embodiments, the one of the plurality of sleeve rods located at the bottom includes a first section, a second section, and a third section sequentially connected in the top-to-bottom direction; the first section is configured to be socked and mated with a corresponding sleeve rod adjacent to the one of the plurality of sleeve rods located at the bottom, and the second section defines the avoidance hole and the socket hole; a lower end of the third section is arranged in a tapered setting in the top-to-bottom direction; a wall thickness of the second section is greater than a wall thickness of the first section and greater than a wall thickness of the third section.

In some embodiments, the support rod further includes at least one blocking member; for each blocking member, the blocking member includes a limiting portion and an insertion portion that are interconnected; the insertion portion defines a rope fixing hole, and the elastic rope is threaded through the rope fixing hole and fixed with the insertion portion; the insertion portion is disposed inside a corresponding sleeve rod; the corresponding sleeve rod has a limiting surface, and the limiting portion abuts against the limiting surface to limit movements of the blocking member in an axial direction of the corresponding sleeve rod and in a direction facing the limiting surface.

In some embodiments, a number of the at least one blocking member is plural; the at least one blocking member includes a first blocking member and a second blocking member; the first blocking member is disposed at an end of one of the plurality of sleeve rods, and the limiting surface of the one of the plurality of sleeve rods is an end surface of the one of the plurality of sleeve rods; the second blocking member is disposed inside another of the plurality of sleeve rods, and the limiting surface of the another of the plurality of sleeve rods is an interior wall surface formed by a step surface of the another of the plurality of sleeve rods.

In some embodiments, the support rod includes a plurality of support units disposed sequentially in the top-to-bottom direction; for each support unit, the support unit includes at least two of the plurality of sleeve rods and a corresponding elastic rope; in the support unit, an end of the corresponding elastic rope is connected to one of the at least two of the plurality of sleeve rods at a top, and the other end of the corresponding elastic rope is connected to another of the at least two of the plurality of sleeve rods at a bottom.

In some embodiments, a top of the support rod is fixed with a quick-lock coupling; the quick-lock coupling includes a first clamp member, a second clamp member, a turning handle, and a locking portion; the first clamp member has a first end portion and a second end portion opposite to each other, and the second clamp member has a third end portion and a fourth end portion opposite to each other; the first end portion and the third end portion are rotatably connected; the second end portion and the fourth end portion are capable of being opened and closed relative to each other, and collectively enclosing to define a clamping hole in condition of the second end portion and the fourth end portion being closed relative to each other; the turning handle is rotatably connected to the second end portion to have a locked state and an unlocked state; the locking portion is capable of being coupled and linked with the turning handle; in the locked state, the locking portion and the turning handle act together to cause the second end portion and the fourth end portion to be pressed against each other to achieve closure; in the unlocked state, the second end portion and the fourth end portion are capable of being opened relative to each other.

In some embodiments, the turning handle includes a connection rod and a handholding portion; an end of the connection rod is rotatably connected to the second end portion, the other end of the connection rod is arranged with an external thread to be screwed with the handholding portion, and the locking portion is movably sleeved on the connection rod and located between the second end portion and the handholding portion; a side of the fourth end portion defines an avoidance notch; in the locked state, the connection rod is placed in the avoidance notch, and the handholding portion presses the locking portion against the side of the fourth end portion away from the first clamp member.

In some embodiments, the handholding portion includes a handle and a screwing rod, the screwing rod defining a screwing hole to be screwed to the connection rod, and an axial direction of the screwing hole intersecting with a lengthwise direction of the screwing rod; the handle includes an eccentric cam, the eccentric cam being rotatably connected to the screwing rod to be able to press the locking portion when rotated until the locking portion abuts against the side of the fourth end portion away from the first clamp member; or the handholding portion is capable of being moved in a lengthwise direction of the connection rod to adjust a distance between the locking portion and the fourth end portion.

In some embodiments, the locking portion is rotatably connected to the turning handle, and a rotation axis of the locking portion and the turning handle is parallel to a rotation axis of the turning handle and the second end portion; the fourth end portion is arranged with a first snap portion, and the locking portion is arranged with a second snap portion; in the locked state, the second snap portion is snapped to the first snap portion; one of the first snap portion and the second snap portion is a slot, and the other of the first snap portion and the second snap portion is a protrusion; or, both the first snap portion and the second snap portion are protrusions.

In some embodiments, the locking portion is rotatably connected to the fourth end portion, and a rotation axis of the locking portion and the fourth end portion is parallel to a rotation axis of the turning handle and the second end portion; the turning handle is arranged with a third snap portion, and the locking portion is arranged with a fourth snap portion; in the locked state, the third snap portion is snapped to the fourth snap portion, and the locking portion is stretched; one of the third snap portion and the fourth snap portion is a slot, and the other of the third snap portion and the fourth snap portion is a protrusion; or, both the third snap portion and the fourth snap portion are protrusions.

In some embodiments, a thimble is arranged at an upper end of the support rod.

The present disclosure further provides an outdoor appliance, including: a cover portion; and the support device as above; wherein an upper end of the support rod is supported on the cover portion, and a lower end of the support rod is configured to support on the ground.

The present disclosure further provides an outdoor appliance, including: a cover portion; a cross-rod, extending along a transverse direction and supported on a bottom surface of the cover portion; and the support device as above; wherein the cross-rod passes through the clamping hole.

The technical solution in the embodiments of the present disclosure, due to the provision of the pedal member, the pedal member is inserted in the peripheral wall of the sleeve rod and protrudes out of the peripheral wall, such that the pedal member provides a foot position, and the user can hold any sleeve rod with his/her hand to apply a downward force while the foot is stepped on the pedal member to apply force at the same time. In this way, the use of hands and feet may reduce the difficulty of inserting the support rod into the ground, thereby allowing the support rod to be easily inserted deeper into the ground and reducing the difficulty of reinforcing the support device.

When the support device is required to be stowed, the multiple sleeve rods can be disengaged from insertion, and due to the presence of the at least one elastic rope, which connects the multiple sleeve rods in series, the multiple sleeve rods may be prevented from being loosened, such that the risk of the sleeve rods being lost may be reduced. Since the pedal member is fixed to the elastic rope at the bottom, the pedal member may likewise be prevented from being lost when the pedal member is removed from the sleeve rod. In this way, the pedal member can be detachably connected to the support rod, realizing that the pedal member can be plugged and removed to reduce the storage space, while the pedal member may be prevented from being lost.

BRIEF DESCRIPTION OF THE DRAWINGS

To illustrate the technical solutions of the embodiments of the present disclosure more clearly, the accompanying drawings of the embodiments will be briefly described below, and it will be apparent that the accompanying drawings in the following description relate only to some embodiments of the present disclosure and other accompanying drawings can be obtained according to these drawings by those skilled in the art without creative labor.

FIG. 2b is an axially cross-sectional schematic view of the support device in FIG. 2a.

FIG. 3b is an axially cross-sectional schematic view of a sleeve rod in FIG. 3a.

FIG. 4 is a structural schematic view of a pedal member in FIG. 3a.

Figure 1:
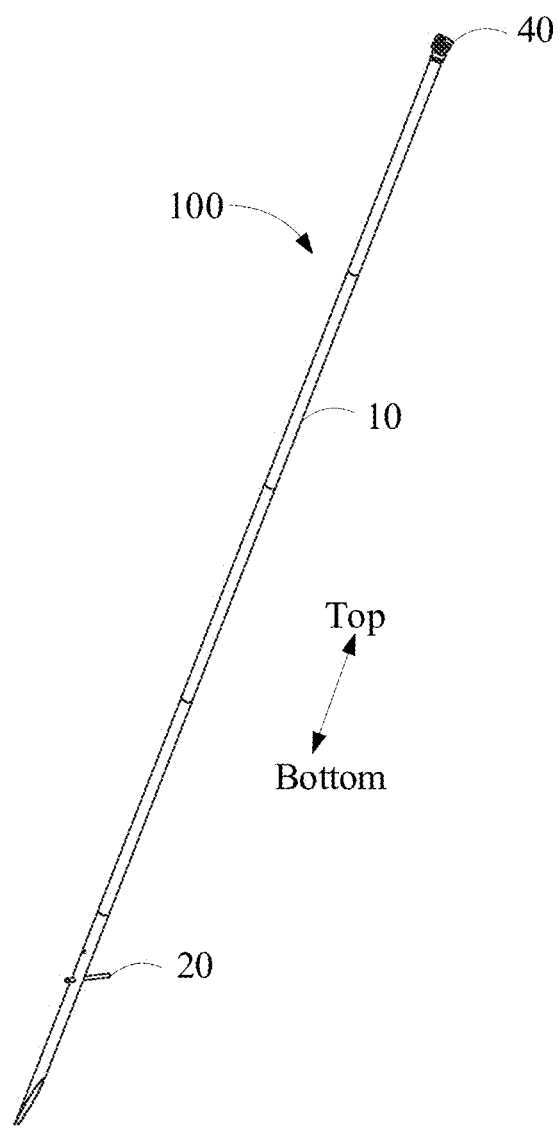
FIG. 1 is a structural schematic view of a support device according to some embodiments of the present disclosure.

| Reference numerals: | | | | | |
|---|---|---|---|---|---|
| No. | Name | No. | Name | No. | Name |
| 100 | support device | 32 | insertion portion | 422 | fourth end portion |
| 10 | support rod | 321 | rope fixing hole | 423 | avoidance notch |
| 11 | sleeve rod | 322 | large end | 424 | clamping hole |
| 111 | avoidance hole | 323 | small end | 621 | first snap portion |
| 112 | socket hole | 33 | first blocking member | 43/53/63 | turning handle |
| 113 | first section | 331 | recess | 431/531 | connection rod |
| 114 | second section | 34 | second blocking member | 432/532 | handholding portion |
| 115 | third section | 40/50/60 | | | |
| 12 | support unit | 41/51/61 | quick-lock coupling | 4321 | handle |
| 20 | pedal member | 411 | first clamp member | 4322 | eccentric cam |
| 21 | threading hole | 412 | first end portion | 4323 | screwing rod |
| 30 | blocking member | 42/52/62 | second end portion second clamp member | 44/54/64 | locking portion |
| 31 | limiting portion | 421 | third end portion | 641 | second snap portion |
| | | | | 70 | thimble |
| | | | | 80 | elastic rope |

DETAILED DESCRIPTION

The technical solutions in the embodiments of the present disclosure will be described clearly and completely in the following in conjunction with the accompanying drawings in the embodiments of the present disclosure, and it is obvious that the described embodiments are only a part of the embodiments of the present disclosure and not all of them. Based on the embodiments in the present disclosure, all other embodiments obtained by those skilled in the art without making creative labor fall within the scope of the present disclosure.

It should be noted that in the description of the present disclosure, when terms of "first", "second", etc. appear, the terms are only intended to facilitate the description of different parts or names, and are not to be understood as indicating or implying sequential relationships, relative importance, or implicitly specifying the number of technical features indicated. As a result, a feature defined with "first" or "second" may include at least one such feature, either explicitly or implicitly. In addition, when terms of "and/or" appear throughout the text, it is meant to include three concurrent solutions, and in the case of "A and/or B", it is meant to include an A solution, a B solution, or a solution in which both A and B are satisfied.

Referring to FIGS. 1 to 4, the present disclosure proposes a support device 100 configured to support an outdoor appliance such as a tent, a canopy, etc. Specifically, the support device 100 includes: a support rod 10, a pedal member 20, and at least one elastic rope 80, the support rod 10 including multiple sleeve rods 11 disposed sequentially from a top to a bottom; for each adjacent two of the multiple sleeve rods 11, an end portion of one of the adjacent two is socked and mated with an end portion of the other of the adjacent two; a peripheral wall of one of the multiple sleeve rods 11 located at the bottom defines an avoidance hole 111 and a socket hole 112. The pedal member 20 is socked and mated with the socket hole 112. The at least one elastic rope 80 is disposed within the multiple sleeve rods 11 and is sequentially threaded through the multiple sleeve rods 11. A lower end of one of the at least one elastic rope 80 is threaded out of the avoidance hole 111 and fixed to the pedal member 20, and an upper end of the elastic rope 80 is connected to another of the multiple sleeve rods 11.

In the embodiments of the present disclosure, since the pedal member 20 is inserted in a peripheral wall of the sleeve rod 11 at the bottom and protrudes outside the peripheral wall, the pedal member 20 provides a foot position, and a user can hold any sleeve rod 11 with his/her hand to apply a downward force while the foot is stepped on the pedal member 20 to apply force at the same time. In this way, the use of hands and feet may reduce the difficulty of inserting the support rod 10 into the ground, thereby allowing the support rod 10 to be easily inserted deeper into the ground and reducing the difficulty of reinforcing the support device 100.

When the support device 100 is required to be stowed, the multiple sleeve rods 11 can be disengaged from insertion, and due to the presence of the at least one elastic rope 80, which connects the multiple sleeve rods 11 in series, the multiple sleeve rods 11 may be prevented from being loosened, such that the risk of the sleeve rods 11 being lost may be reduced. Since the pedal member 20 is fixed to the elastic rope 80 at the bottom, the pedal member 20 may likewise be prevented from being lost when the pedal member 20 is removed from the sleeve rod 11. In this way, the pedal member 20 can be detachably connected to the support rod 10, realizing that the pedal member 20 can be plugged and removed to reduce the storage space, while the pedal member 20 may be prevented from being lost.

The shape of the pedal member 20 may be set as an elongated cylinder, a square cylinder, a triangular prism, or an elongated rod with an irregular cross-section, as long as the pedal member 20 can protrude outside the peripheral wall of the sleeve rod 11 to provide the user with a foot position. In some embodiments, the pedal member 20 is a cylindrical insert and fits into the socket hole 112 with a gap between the two, such that the pedal member 20 can be more easily removed from the socket hole 112.

Figure 3A:
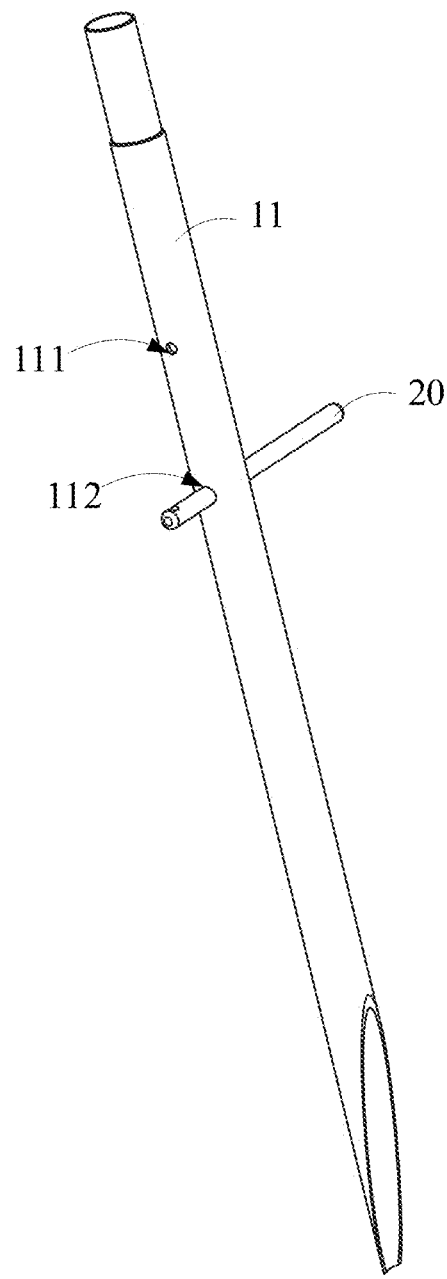
FIG. 3a is a schematic view of a partial structure of the support device in FIG. 1.
Figure 3B:
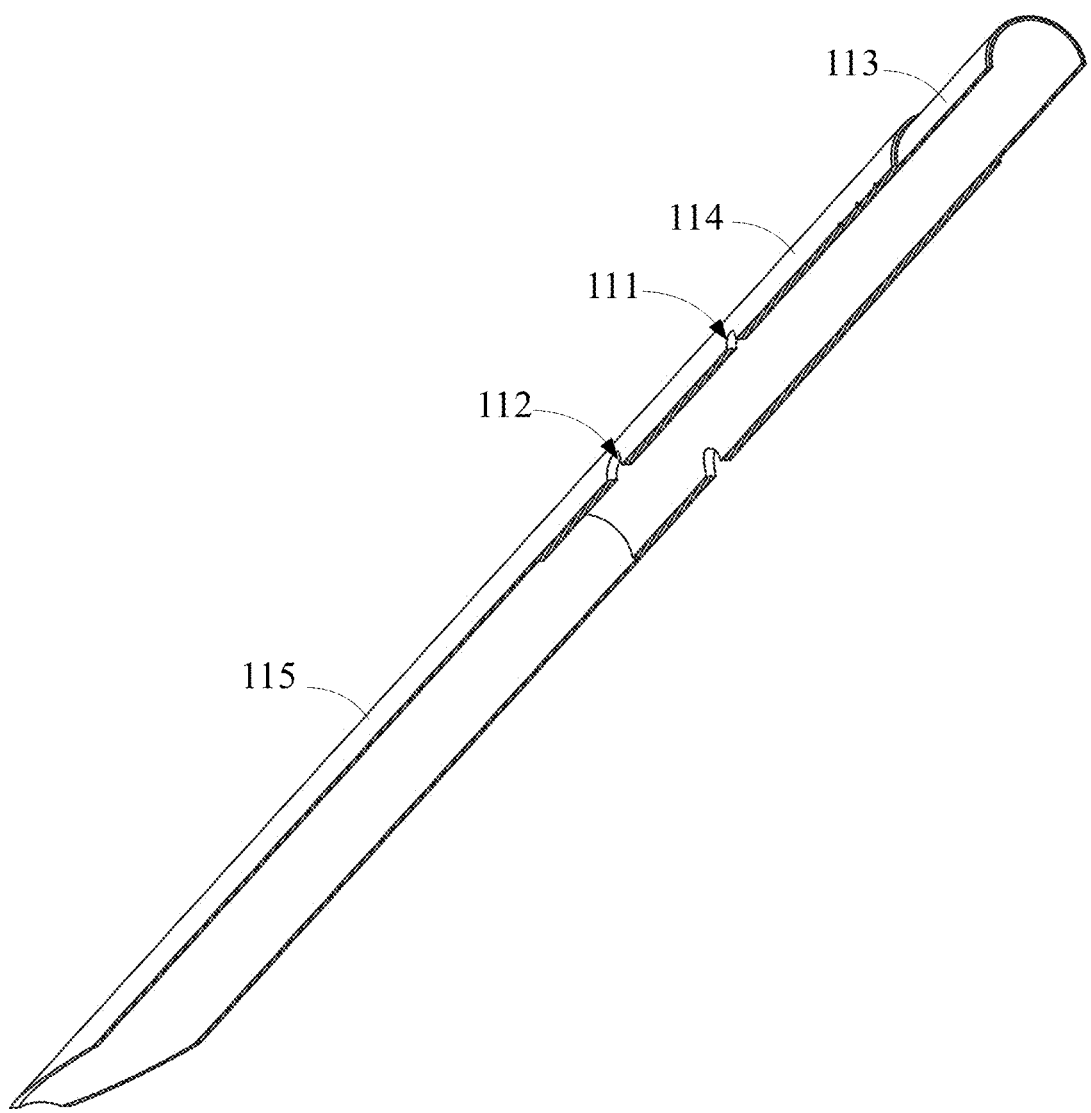

Referring to FIGS. 3a and 3b, in some embodiments, the sleeve rod 11 at the bottom defines specifically two socket holes 112, and the two socket holes 112 are aligned along a radial direction of the sleeve rod 11, such that the pedal member 20 can be inserted into the two socket holes 112 along the radial direction of the sleeve rod 11 at the same time, and two ends of the pedal member 20 are supported by the walls of the two socket holes 112, which provides a larger area of force and prevents the pedal member 20 from tipping over.

Figure 4:
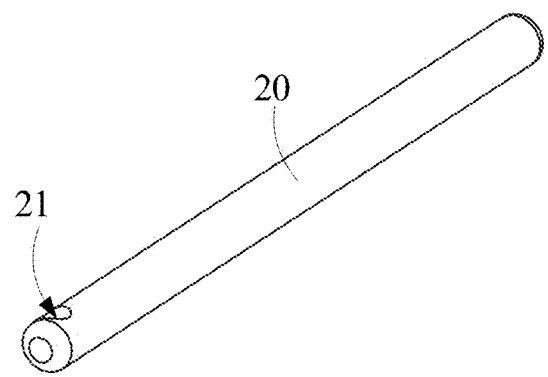

Referring to FIG. 4, in some embodiments, the pedal member 20 defines a threading hole 21, and the lower end of the elastic rope 80 at the bottom is threaded through the threading hole 21, such that the elastic rope 80 can be fixed to the pedal member 20 by means of a knot. Each elastic rope 80 may be provided as an elastic cord such as a leather band.

To prevent the pedal member 20 from entering the interior of the sleeve rod 11 through the avoidance hole 111 and causing the pedal member 20 to be more difficult to remove, in some embodiments, the aperture of the avoidance hole 111 is less than the aperture of the socket hole 112 and less than the diameter of the pedal member 20. In this way, the pedal member 20 cannot enter the interior of the sleeve rod 11 through the avoidance hole 111, and it is further ensured that the lower end of the elastic rope 80 fixed to the pedal member 20 cannot freely enter or leave the avoidance hole 111.

Further, the lower end of the elastic rope 80 is arranged with a knot, which is disposed outside the sleeve rod 11 to restrict passage through the avoidance hole 111, such that the knot restricts the lower end of the elastic rope 80 from retracting into the interior of the sleeve rod 11 and avoids the pedal member 20 from passing through the avoidance hole 111. The knot herein refers to a structure formed by the elastic rope 80 knotting itself.

Referring to FIGS. 5a to 5d, the support rod 10 further includes a blocking member 30; the blocking member 30 includes a limiting portion 31 and an insertion portion 32 that are interconnected, where the insertion portion 32 is disposed inside a corresponding sleeve rod 11, the insertion portion 32 defines a rope fixing hole 321, and a corresponding elastic rope 80 is threaded through the rope fixing hole 321 and fixed with the insertion portion 32. The corresponding sleeve rod 11 has a limiting surface, and the limiting portion 31 abuts against the limiting surface to limit movement of the blocking member 30 in an axial direction of the sleeve rod 11 and in a direction facing the limiting surface. During an assembling process, the blocking member 30 may be arranged on each of two sleeve rods 11, and each of both ends of a corresponding elastic rope 80 is connected to a corresponding blocking member 30. The corresponding elastic rope 80 is always in a state of tension, such that it can tighten the two blocking members 30 in the direction of proximity to each other, which causes the limiting portion 31 of the blocking member 30 to abut against the limiting surface of the corresponding sleeve rod 11, thereby preventing the movement of the blocking members 30 in the direction of proximity to each other and ensuring that the at least one elastic rope 80 can always connect the multiple sleeve rods 11 in series.

In some embodiments, the support rod 10 includes multiple the blocking members 30, the multiple blocking members 30 including a first blocking member 33 and a second blocking member 34; the first blocking member 33 is disposed at an end of one of the two sleeve rods 11, and the limiting surface is an end surface of the sleeve rod 11; the second blocking member 34 is disposed inside the other of the two sleeve rods 11, and the limiting surface is an interior wall surface formed by a step surface of the sleeve rod 11. That is, the limiting portion 31 of the first blocking member 33 is located outside the corresponding sleeve rod 11.

Figure 5A:
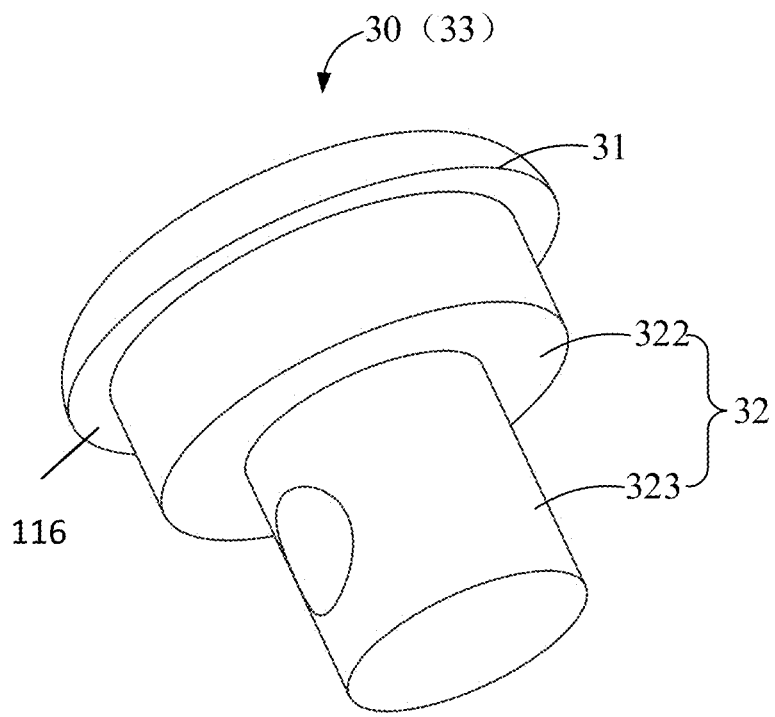
FIG. 5a is a structural schematic view of a blocking member in FIG. 1 according to some embodiments of the present disclosure.

The structure of the first blocking member 33 and the second blocking member 34 may be the same or different. Specifically, as shown in FIG. 5a, the insertion portion 32 of the first blocking member 33 is a stepped shaft, specifically including a large end 322 and a small end 323; where the large end 322 is disposed between the limiting portion 31 and the small end 323; the diameter of the large end 322 is greater than the diameter of the small end 323; the large end 322 is in contact with an inner wall surface of the sleeve rod 11 to realize a tight fit; the small end 323 defines the rope fixing hole 321. As shown in FIG. 5d, the insertion portion 32 of the second blocking member 34 is a cylindrical structure of substantially equal diameter, and can be mated with the inner wall surface of the sleeve rod 11 with a gap between the two.

In the above, the at least one elastic rope 80 being disposed within the multiple sleeve rods 11 and sequentially threaded through the multiple sleeve rods 11 means that: a single elastic rope 80 may connect all the sleeve rods 11 in series, i.e. the elastic rope 80 is connected to an end of the sleeve rod 11 at the top and an end of the sleeve rod 11 at the bottom; alternatively, multiple elastic ropes 80 are provided, each of which is connected to two or more of the multiple sleeve rods 11.

Figure 2A:
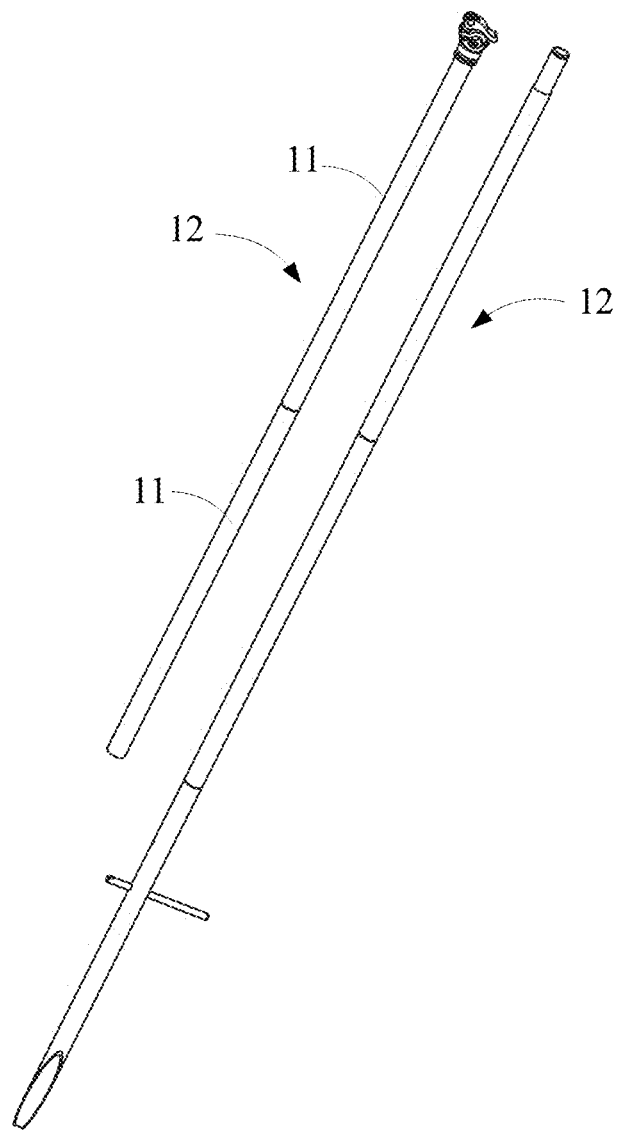
FIG. 2a is a disassembled view of the support device in FIG. 1.
Figure 2B:
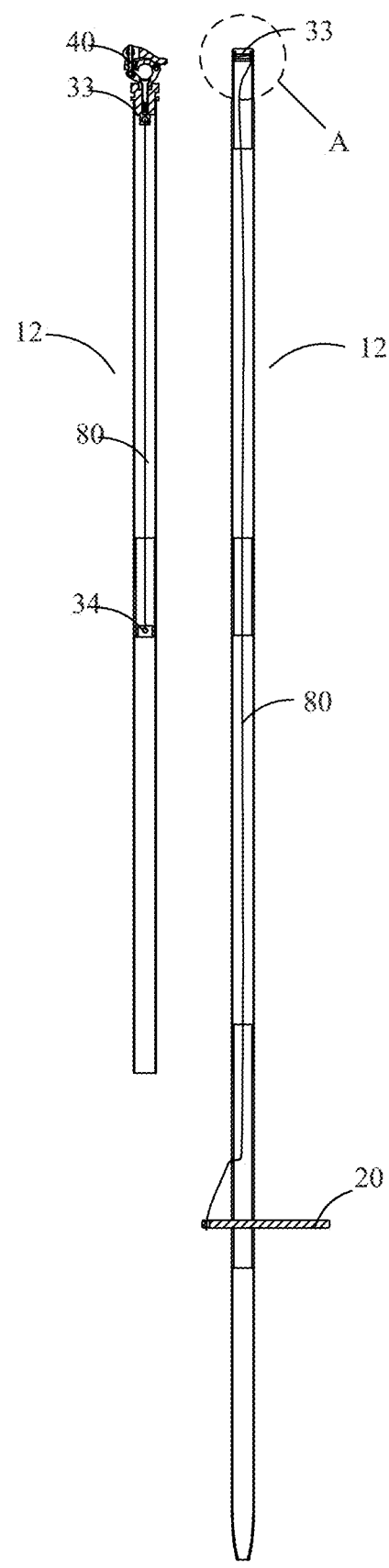
Figure 2C:
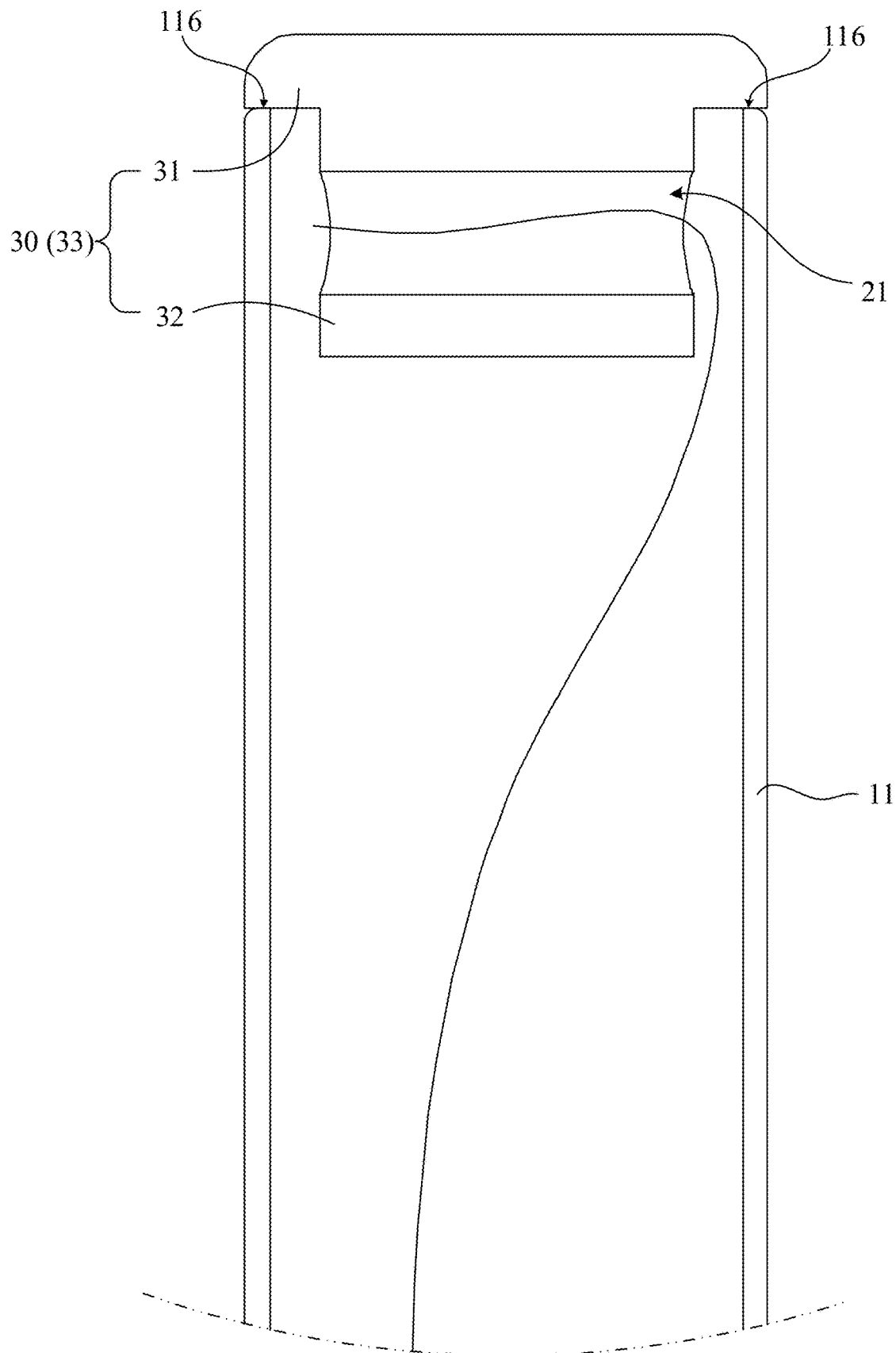

Referring to FIGS. 2a and 2b, two support units 12 are not assembled. In some embodiments, the support rod 10 includes multiple support units 12 disposed sequentially from top to bottom, each support unit 12 including at least two sleeve rods 11 and an elastic rope 80. In the same support unit 12, two ends of the elastic rope 80 are connected to the sleeve rod 11 at the top and the sleeve rod 11 at the bottom; for two support units 12 adjacent to each other, a sleeve rod 11 of one support unit 12 is inserted into a sleeved rod 11 of the other support unit 12, such that the two support units 12 are inserted and fixed. Therefore, in a stowed state, not all the multiple sleeve rods 11 are limited by a same elastic rope 80, and sleeve rods 11 limited by a same elastic rope 80 forms a stowed unit. In this way, multiple stowed units can be formed, which reduces the size of each stowed unit and the difficulty of stowing. When the support function is required, the sleeve rods 11 in each storage unit can be connected first, which has a lower height after connected, and then the multiple storage units can be docked, thereby reducing the difficulty of mounting.

In some embodiments, the support rod 10 includes two support units 12. One of the two support units 12 is arranged with the first blocking member 33 at a top of the support unit 12, where the limiting portion 31 of the first blocking member 33 is arranged with a quick-lock coupling 40/50/60 or a thimble 70 (as described in later embodiments), and the limiting portion 31 is further arranged with an annular recess 331 for securing a windbreak rope. In addition, the sleeve rod 11 at the bottom of the support unit 12 is arranged with the second blocking member 34 within the sleeve rod 11, and the top and bottom ends of an elastic rope 80 are connected to the first blocking member 33 and the second blocking member 34, respectively. The other of the two support units 12 is arranged with the first blocking member 33 at a top of the support unit 12, and the sleeve rod 11 at the bottom of the support unit 12 is arranged with the pedal member 20; where the top and bottom ends of another elastic rope 80 are connected to the first blocking member 33 and the pedal member 20, respectively.

Figure 5B:
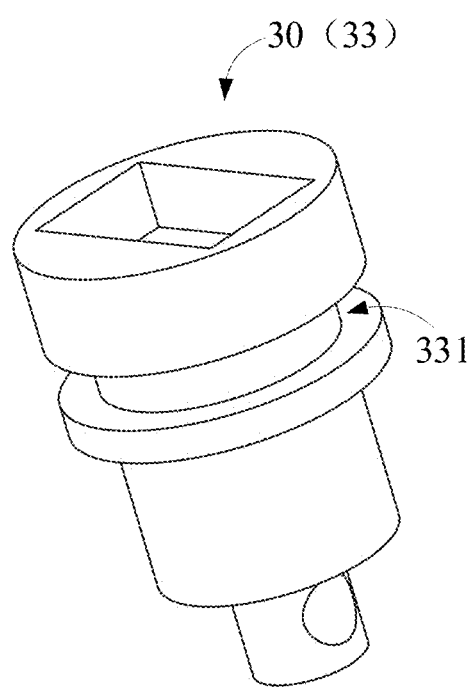
FIG. 5b is a structural schematic view of a blocking member in FIG. 1 according to other embodiments of the present disclosure.
Figure 5C:
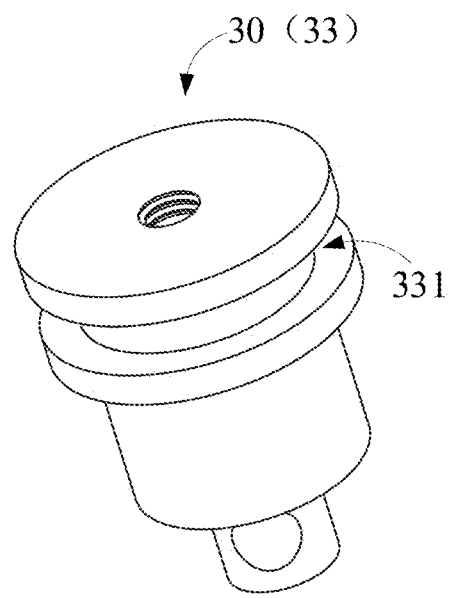
FIG. 5c is a structural schematic view of a blocking member in FIG. 1 according to further other embodiments of the present disclosure.
Figure 5D:
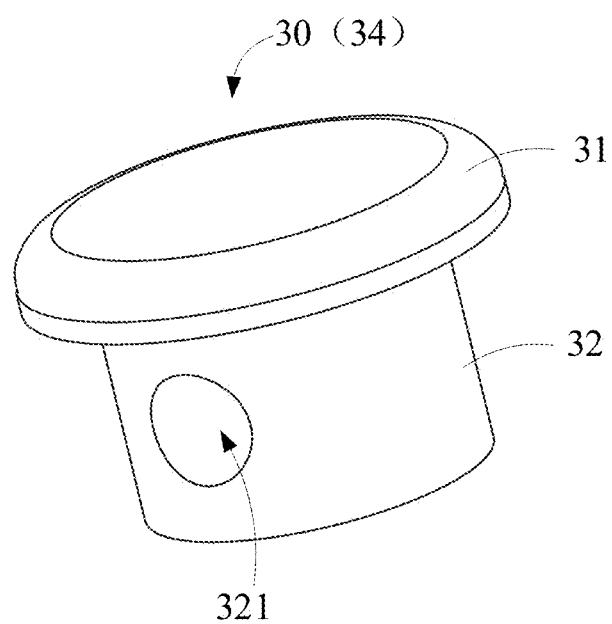
FIG. 5d is a structural schematic view of a blocking member in FIG. 1 according to still other embodiments of the present disclosure.

To connect the quick lock coupling 40/50/60 or the thimble 70, a top surface of the first limiting portion 31 of the first blocking member 33 may define a through hole correspondingly, e.g., in a shape of round or square, the first blocking member 33 in FIG. 5b being configured to be connected to the quick lock coupling 40/50/60, and the first blocking member 33 in FIG. 5c being configured to be connected to the thimble.

In some embodiments, a lower end of the sleeve rod 11 at the bottom of the support rod 10 is arranged in a tapered setting from top to bottom. For example, the lower end of the sleeve rod 11 is wedge-shaped or tapered to have a tip, for facilitating insertion into the ground.

Referring in conjunction to FIG. 3b, the sleeve rod 11 at the bottom of the support rod 10 includes a first section 113, a second section 114, and a third section 115 sequentially connected from top to bottom; where the first section 113 is configured to be socked and mated with another socket rod 11 disposed above and adjacent thereto, the second section 114 defines the avoidance hole 111 and the socket hole 112, and the third section 115 is arranged with the wedge-shaped or tapered lower end, with the wall thickness of the second section 114 being greater than the wall thickness of the first section 113 and greater than the wall thickness of the third section 115, such that the structural strength can still be ensured after the opening of the avoidance hole 111 and the socket hole 112. The thinner wall thickness of the first section 113 may be set as follows: the inner wall surface of the first section 113 is flush with the inner wall surface of the second section 114, such that the outer wall surface of a connection of the first section 113 and the second section 114 forms a stepped surface to positionally limit the sleeve rod 11 above. The thinner wall thickness of the third section 115 may be set as follows: the outer wall surface of the third section 115 is flush with the outer wall surface of the second section 114, such that a smooth outer wall surface can be formed at a connection of the third section 115 and the second section 114.

Referring to FIGS. 6 to 12, further, the top of the support rod 10 is fixed with a quick-lock coupling 40/50/60, the quick-lock coupling 40/50/60 defining a clamping hole 424 for a cross-rod (not shown) to pass through and lock, and the cross-rod supports the tent or canopy along the transverse direction. Alternatively, as shown in FIG. 13, a thimble 70 is secured to the top of the support rod 10 to lift the tent or canopy upwardly.

Figure 6:
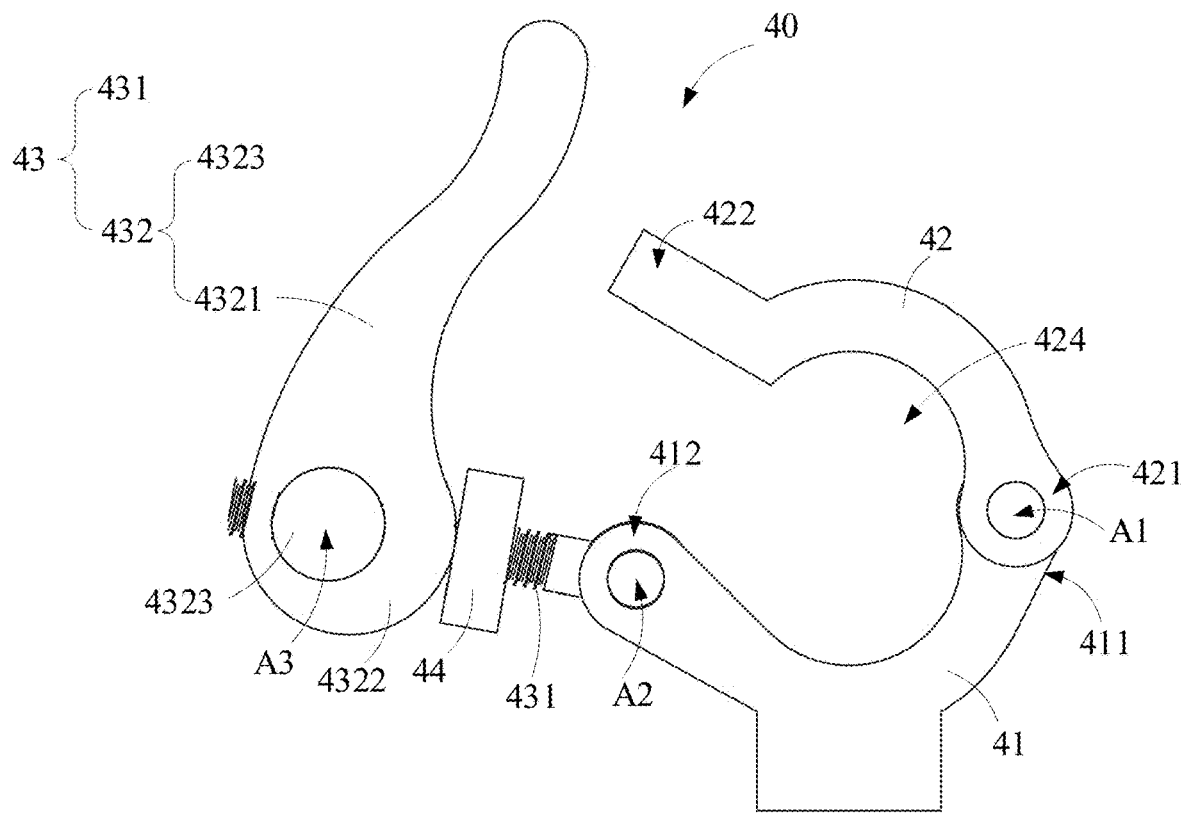
FIG. 6 is a structural schematic view of a quick-lock coupling in an unlocked state according to some embodiments of the present disclosure.
Figure 7:
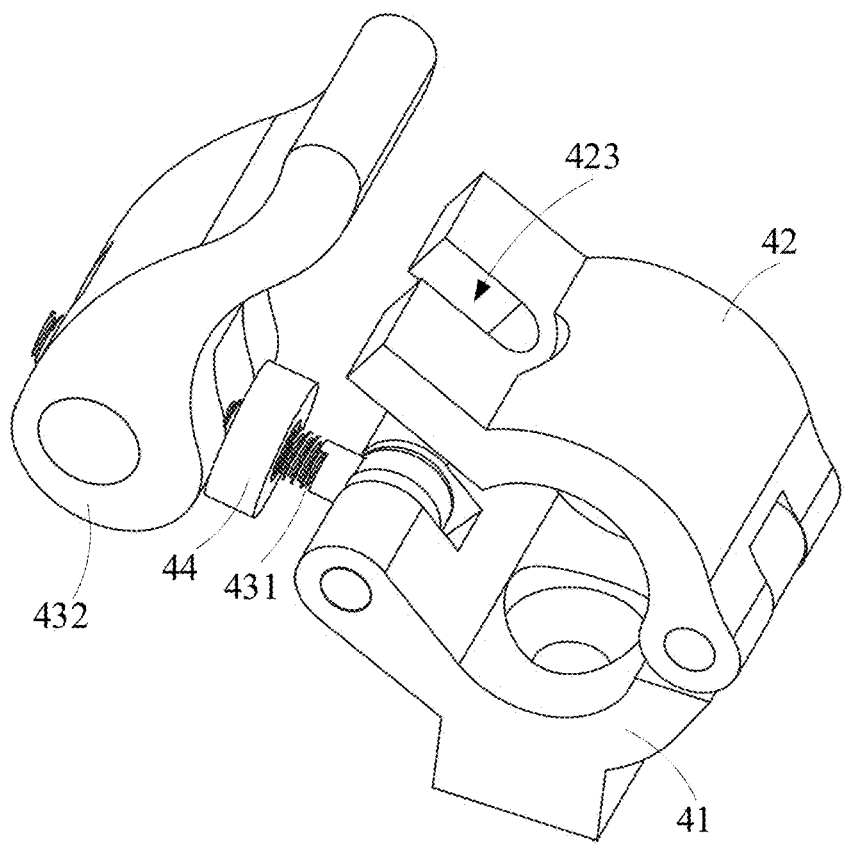
FIG. 7 is another structural schematic view of the quick-lock coupling in FIG. 6 in the unlocked state.
Figure 8:
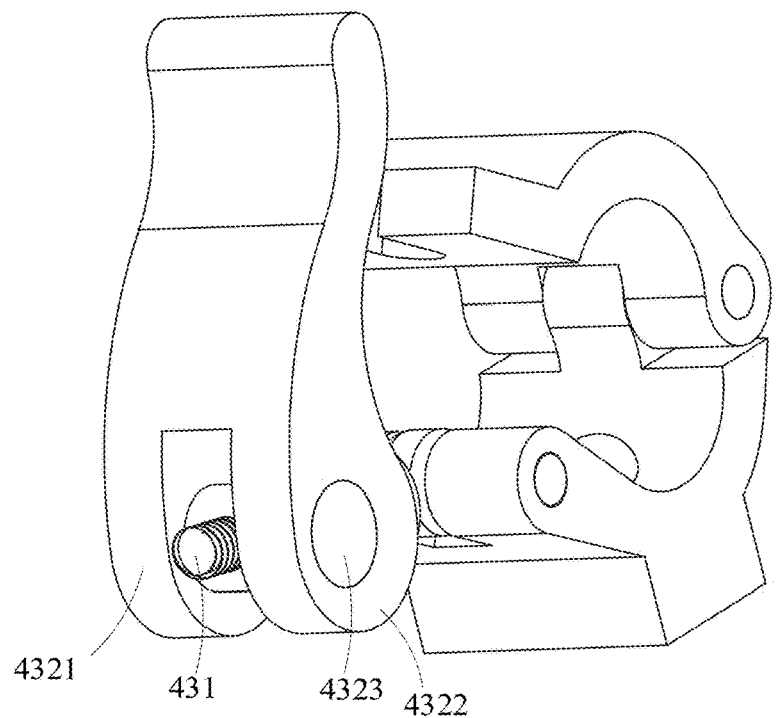
FIG. 8 is further another structural schematic view of the quick-lock coupling in FIG. 6 in the unlocked state.
Figure 9:
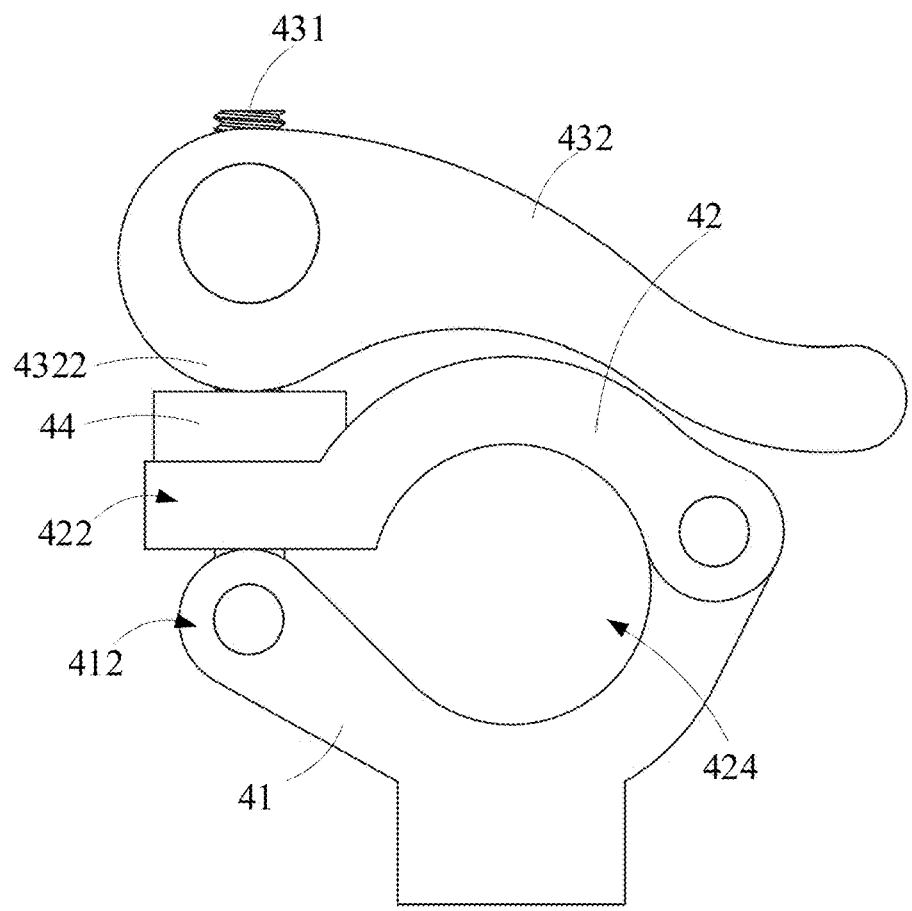
FIG. 9 is a structural schematic view of the quick-lock coupling in FIG. 6 in a locked state.

When the quick-lock coupling 40/50/60 is provided, the quick-lock coupling 40/50/60 includes a first clamp member 41/51/61, a second clamp member 42/52/62, a turning handle 43/53/63, and a locking portion 44/54/64. The first clamp member 41/51/61 has a first end portion 411 and a second end portion 412 opposite to each other, and the second clamp member 42/52/62 has a third end portion 421 and a fourth end portion 422 opposite to each other. The first end portion 411 and the third end portion 421 are rotatably connected, and the second end portion 412 and the fourth end portion 422 are capable of being opened and closed relative to each other and collectively enclosing the clamping hole 424 when closed. The turning handle 43/53/63 is rotatably connected to the second end portion 412 to have a locked state and an unlocked state; the locking portion 44/54/64 is capable of being coupled and linked with the turning handle 43. As shown in FIG. 9, in the locked state, the locking portion 44 and the turning handle 43 act together to cause the second end portion 412 and the fourth end portion 422 to be pressed against each other to achieve closure, in which case the second end portion 412 and the fourth end portion 422 abut against each other by the locking portion 44 and the turning handle 43 to avoid popping open, and the cross-rod is disposed in the clamping hole 424 and clamped by the first clamp member 41 and the second clamp member 42 together. As shown in FIGS. 6 to 8, in the unlocked state, the locking portion 44 and the turning handle 43 can be moved away such that the second end portion 412 and the fourth end portion 422 can be opened relative to each other, and the cross-rod is not clamped by the first clamp member 41 and the second clamp member 42 and can therefore be removed.

The first clamp member 41 and the second clamp member 42 may be substantially semi-circular in shape, and when butted together they may form a circular clamping hole 424.

The quick-lock coupling 40/50/60 may have various specific forms. In a first implementation, referring to FIGS. 6 to 9, the turning handle 43 includes a connection rod 431 and a handholding portion 432, with an end of the connection rod 431 being rotatably connected to the second end portion 412, the other end of the connection rod 431 being arranged with an external thread to be screwed with the handholding portion 432, and the locking portion 44 being movably sleeved on the connection rod 431 and located between the second end portion 412 and the handholding portion 432; a side of the fourth end portion 422 defines an avoidance notch 423. In the locked state, the connection rod 431 is placed in the avoidance notch 423, and the handholding portion 432 presses the locking portion 44 against the side of the fourth end portion 422 that is away from the first clamp member 41, i.e., the fourth end portion 422 is clamped between the second end portion 412 and the locking portion 44, preventing the fourth end portion 422 from opening with respect to the second end portion 412, thereby enabling locking of the cross-rod.

Since the other end of the connection rod 431 is provided with the external thread to be screwed to the handholding portion 432, the position of the handholding portion 432 on the connection rod 431 can be adjusted, whereby the distance between the handholding portion 432 and the fourth end portion 422 can be adjusted, thereby adjusting the magnitude of the force with which the handholding portion 432 abuts against the locking portion 44.

In the locked state, the connection rod 431 is disposed in the avoidance notch 423 and thus can be positionally limited by the wall of the avoidance notch 423, which may realize the pre-alignment of the first clamp member 41 and the second clamp member 42 and prevent the connection rod 431 from being deflected.

The quick-lock coupling 40/50 in the first implementation may likewise have a variety of different deformations. Specifically, with reference to FIGS. 6 to 9, in some embodiments, the handholding portion 432 includes a handle 4321 and a screwing rod 4323, the screwing rod 4323 defining a screwing hole to be screwed to the connection rod 431, and the axial direction of the screwing hole intersecting with the lengthwise direction of the screwing rod 4323; the handle 4321 includes an eccentric cam 4322, the eccentric cam 4322 being rotatably connected to the screwing rod 4323 to be able to press the locking portion 44 when rotated until the locking portion 44 abuts against the side of the fourth end portion 422 that is back away from the first clamp member 41. In the embodiments, after the turning handle 43 is rotated until the connection rod 431 is placed in the avoidance notch 423, the handle 4321 is then rotated relative to the screwing rod 4323, such that the eccentric cam 4322 gradually contacts the locking portion 44 during rotation and gradually increases the force against the locking portion 44, in which case the locking portion 44 can abut against the side of the fourth end portion 422 that is back away from the first clamp member 41. During this process, when the eccentric cam 4322 is never in contact with the locking portion 44, the handholding portion 432 may be rotated relative to the connection rod 431 to adjust the distance between the handholding portion 432 and the locking portion 44 in the lengthwise direction of the connection rod 431.

The label of "A1" in FIG. 6 represents a rotation center of the first end portion 411 and the third end portion 421. The label of "A2" in FIG. 6 represents a rotation center of the turning handle 43 and the second end portion 412. The label of "A3" in FIG. 6 represents a rotation center of the handle 4321 and the screwing rod 4323.

Figure 10:
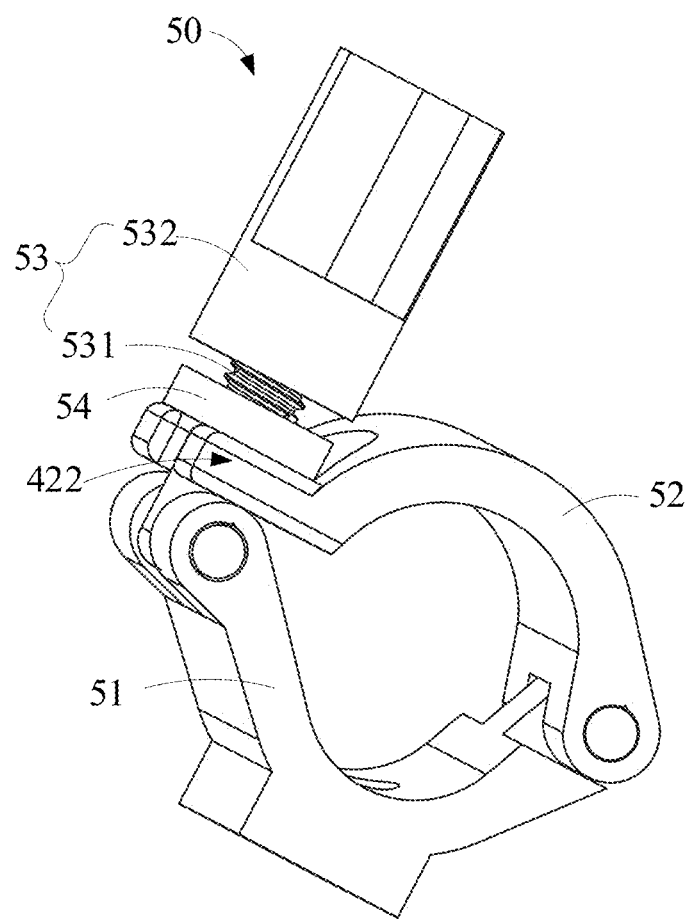
FIG. 10 is a structural schematic view of a quick-lock coupling according to other embodiments of the present disclosure.
Figure 11:
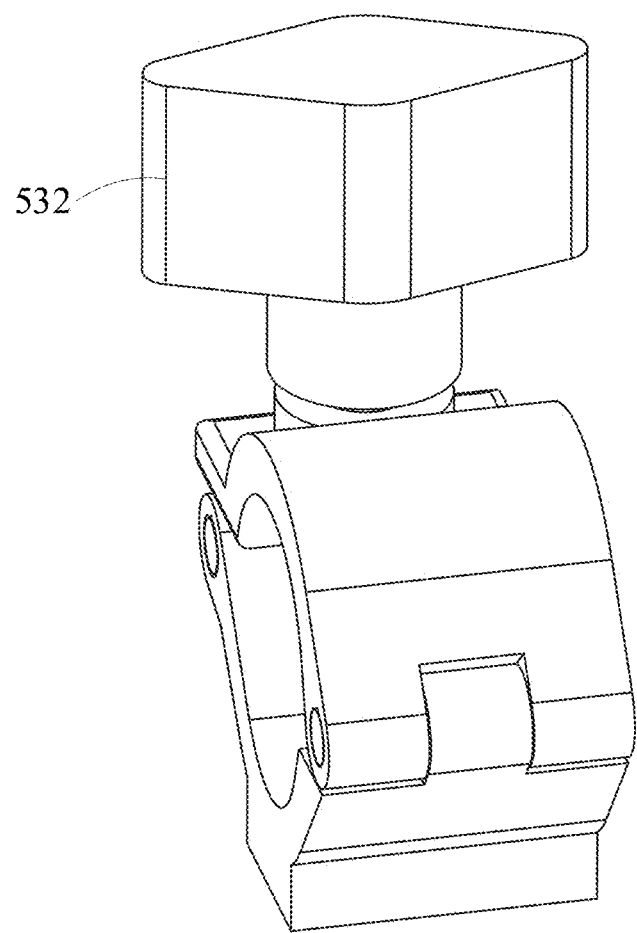
FIG. 11 is a structural schematic view of the quick-lock coupling in FIG. 10.

Alternatively, referring in conjunction to FIGS. 10 and 11, in other embodiments, the turning handle 53 is shaped differently than the turning handle 43 in the first implementation. Specifically, the handholding portion 532 is moved in the lengthwise direction of the connection rod 531 to adjust the distance between the locking portion 54 and the fourth end portion 422. In the embodiments, the handholding portion 532 is a single unit, and no relative movement may occur between its own parts. The position of the handholding portion 532 on the connection rod 531 can be directly adjusted by turning the handholding portion 532 such that the handholding portion 532 can abut against the locking portion 54.

In the above embodiments, the locking portion 44/54 may be a substantially short, flat, hollow column sleeved on the connection rod 431/531.

Figure 12:
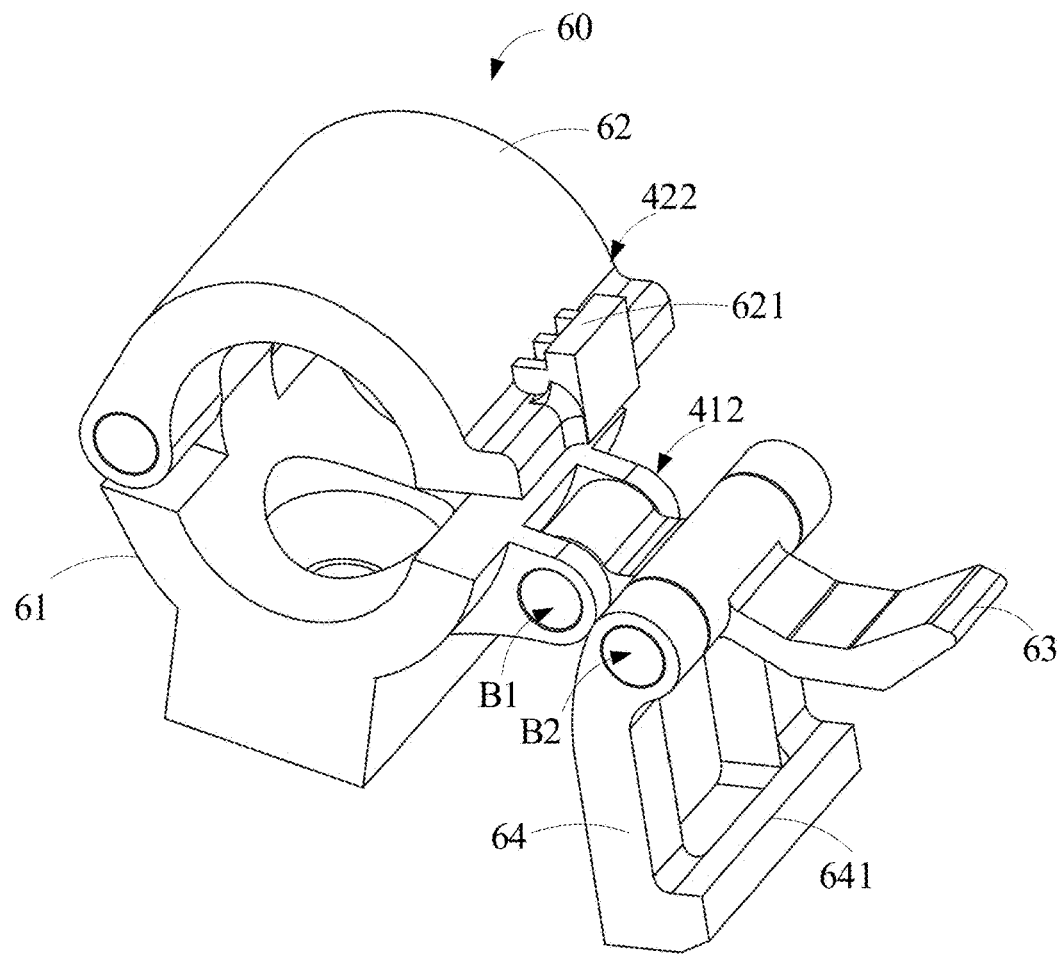
FIG. 12 is a structural schematic view of a quick-lock coupling according to further other embodiments of the present disclosure.
Figure 13:
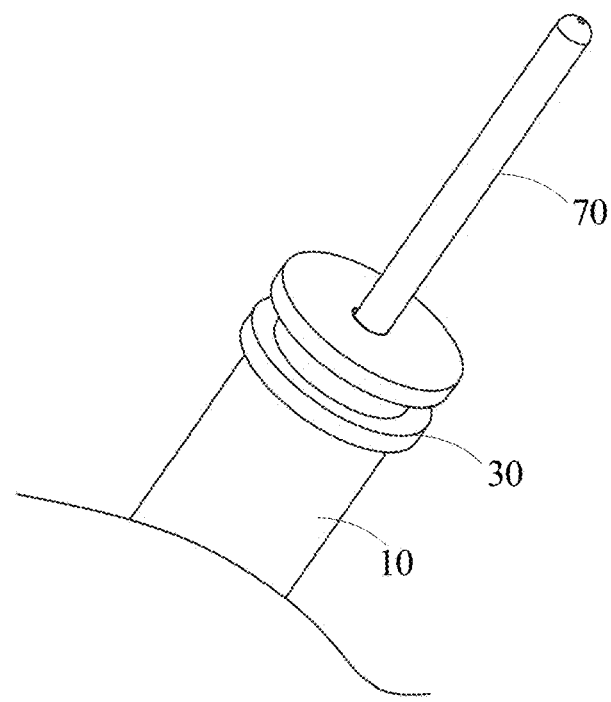
FIG. 13 is a partial schematic view of a support device according to other embodiments of the present disclosure.
Figure 14:
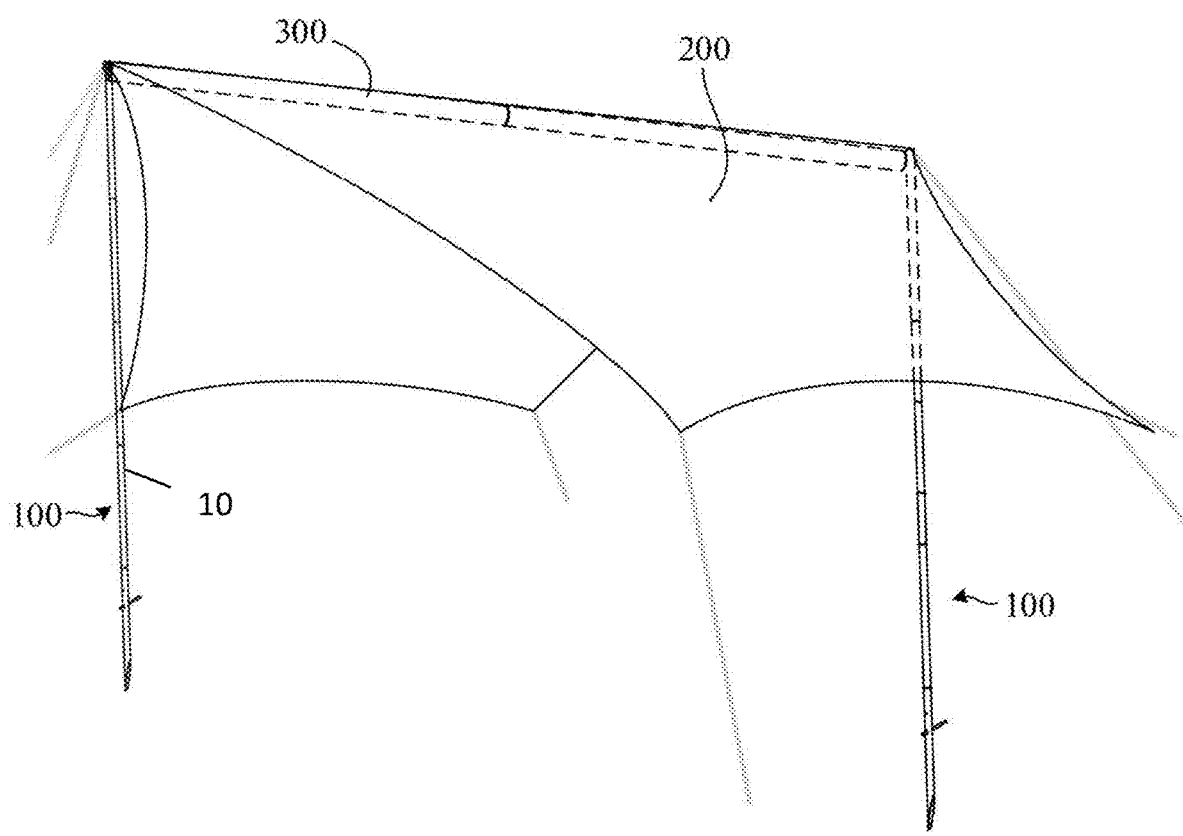

In a second implementation, with reference to FIG. 12, the locking portion 64 is rotatably connected to the turning handle 63, and a rotation axis of the locking portion 64 and the turning handle 63 is parallel to a rotation axis of the turning handle 63 and the second end portion 412. In FIG. 12, the label of "B1" represents a rotation center of the turning handle 63 and the second end portion 412, and the label of "B2" represents a rotation center of the locking portion 64 and the turning handle 63.

The fourth end portion 422 is arranged with a first snap portion 621, and the locking portion 64 includes a second snap portion 641. In the locked state, the second snap portion 641 is snapped to the first snap portion 621. One of the first snap portion 621 and the second snap portion 641 is a slot and the other is a protrusion; alternatively, both the first snap portion 621 and the second snap portion 641 are protrusions. Specifically, the turning handle 63 is elongate in shape with an end rotatably connected to the second end portion 412. The locking portion 64 is substantially in the shape of a frame with one unsealed side, and the unsealed side of the locking portion 64 is rotatably connected to the turning handle 63, such that the turning handle 63 can extend into the locking portion 64. When the turning handle 63 is rotated in a direction away from the fourth end portion 422, the locking portion 64 is rotated in a direction proximate to the fourth end portion 422 and causes the first snap portion 621 and the second snap portion 641 to be snapped together. The second snap portion 641 is arranged on a side of the locking portion 64 away from the unsealed side. Of course, in other embodiments, the shapes of the turning handle 63 and the locking portion 64 are not limited, as long as they can be linked and also rotated with respect to each other.

In a third implementation, the locking portion is rotatably connected to the fourth end portion 422, and the rotation axis of the locking portion and the fourth end portion 422 is parallel to the rotation axis of the turning handle and the second end portion 412. The turning handle is arranged with a third snap portion, and the locking portion is arranged with a fourth snap portion. In the locked state, the third snap portion is snapped to the fourth snap portion, and the locking portion is stretched. One of the third snap portion and the fourth snap portion is a slot and the other is a protrusion; alternatively, both the third snap portion and the fourth snap portion are protrusions. Specifically, the third snap portion may be snapped onto the fourth snap portion, and then the turning handle may be rotated such that the turning handle rotates the locking portion together until the turning handle resists the side of the first clamp member 41 that is back away from the second clamp member 42, in which case the locking portion is stretched, with a tendency to pull the turning handle in the direction of the second clamp member 42, causing the turning handle to better fit against the side of the first clamp member back away from the second clamp member 42. In some embodiments, the locking portion is formed by bending a metal wire or a thin metal rod.

The terms of "parallel" in the above means definitely parallel or close to parallel.

In addition, the quick-lock coupling 40/50/60 may be screwed to the blocking member 30 at the top of the support rod 10.

The embodiments of the present disclosure further provide an outdoor appliance, which may specifically be a tent or a canopy, etc., which is not specifically limited herein. The outdoor appliance includes a cover portion (not shown) and the support device 100, an upper end of the support rod 10 is supported on the cover portion, and a lower end of the support rod 10 is configured to support on the ground. The specific structure of the support device 100 is described in the above embodiments and will not be repeated here.

The cover portion specifically refers to a curtain or tent cloth for covering. When the thimble 70 is arranged at the upper end of the support rod 10, the thimble 70 directly pushes up the cover portion. When the upper end of the support rod 10 is provided with the quick-lock coupling 40/50/60, the outdoor appliance further includes a cross-rod, which extends along the transverse direction and is supported on a bottom surface of the cover portion; the cross-rod passes through the clamping hole 424 of the quick-lock coupling 40/50/60 and is clamped by the first clamp member 41 and the second clamp member 42 together to realize the locking with the support rod 10.

When stowage is required, the locking portion 44 can be made to unlock the first clamp member 41 and the second clamp member 42 by turning the turning handle 43, thereby allowing the support rod 10 to be removed.

Finally, it should be noted that the above embodiments are only intended to illustrate the technical solutions of the present disclosure, not to limit them; although the present disclosure has been described in detail with reference to the foregoing embodiments, those skilled in the art should understand that it is still possible to make modifications to the technical solutions recorded in the foregoing embodiments, or to make equivalent substitutions for some of the technical features therein; and such modifications or substitutions do not cause the essence of the corresponding technical solutions to deviate from the essence of the technical solutions of the present disclosure.

What is claimed is:

1. A support device, comprising:
   a support rod, comprising a plurality of sleeve rods disposed sequentially in a top-to-bottom direction; wherein for each adjacent two of the plurality of sleeve rods, an end portion of one of the adjacent two is configured to be socked and mated with an end portion of the other of the adjacent two; a peripheral wall of one of the plurality of sleeve rods located at a bottom defines an avoidance hole and a socket hole;
   a pedal member, configured to be socked and mated with the socket hole and protruding from the peripheral wall of the one of the plurality of sleeve rods located at the bottom; and
   an elastic rope, disposed within the one of the plurality of sleeve rods located at the bottom, and sequentially threaded through some of the plurality of sleeve rods; wherein a lower end of the elastic rope is threaded out of the avoidance hole and fixed to the pedal member, and an upper end of the elastic rope is connected to another of the some of the plurality of sleeve rods.

2. The support device according to claim 1, wherein the pedal member defines a threading hole, and the lower end of the elastic rope is threaded through the threading hole.

3. The support device according to claim 1, wherein the socket hole comprises two socket holes, and the two socket holes are aligned along a radial direction of the one of the plurality of sleeve rods located at the bottom; and/or
the pedal member is a cylindrical insert to fit into the socket hole with a gap between the pedal member and the socket hole.

4. The support device according to claim 1, wherein an aperture of the avoidance hole is less than an aperture of the socket hole and less than a diameter of the pedal member.

5. The support device according to claim 1, wherein the one of the plurality of sleeve rods located at the bottom comprises a first section, a second section, and a third section sequentially connected in the top-to-bottom direction; the first section is configured to be socked and mated with a corresponding sleeve rod adjacent to the one of the plurality of sleeve rods located at the bottom, and the second section defines the avoidance hole and the socket hole; a lower end of the third section is arranged in a tapered setting in the top-to-bottom direction; a wall thickness of the second section is greater than a wall thickness of the first section and greater than a wall thickness of the third section.

6. The support device according to claim 1, wherein the support rod further comprises at least one blocking member; for each blocking member, the blocking member comprises a limiting portion and an insertion portion that are interconnected; the insertion portion defines a rope fixing hole, and the elastic rope is threaded through the rope fixing hole and fixed with the insertion portion;
the insertion portion is disposed inside a corresponding sleeve rod; the corresponding sleeve rod has a limiting surface, and the limiting portion abuts against the limiting surface to limit movements of the blocking member in an axial direction of the corresponding sleeve rod and in a direction facing the limiting surface.

7. The support device according to claim 6, wherein a number of the at least one blocking member is plural; the at least one blocking member comprises a first blocking member and a second blocking member; the first blocking member is disposed at an end of one of the plurality of sleeve rods, and the limiting surface of the one of the plurality of sleeve rods is an end surface of the one of the plurality of sleeve rods;
the second blocking member is disposed inside another of the plurality of sleeve rods, and the limiting surface of the another of the plurality of sleeve rods is an interior wall surface formed by a step surface of the another of the plurality of sleeve rods.

8. The support device according to claim 1, wherein the support rod comprises a plurality of support units disposed sequentially in the top-to-bottom direction; for each support unit, the support unit comprises at least two of the plurality of sleeve rods and a corresponding elastic rope; in the support unit, an end of the corresponding elastic rope is connected to one of the at least two of the plurality of sleeve rods at a top, and the other end of the corresponding elastic rope is connected to another of the at least two of the plurality of sleeve rods at a bottom.

9. The support device according to claim 1, wherein a top of the support rod is fixed with a quick-lock coupling; the quick-lock coupling comprises a first clamp member, a second clamp member, a turning handle, and a locking portion; the first clamp member has a first end portion and a second end portion opposite to each other, and the second clamp member has a third end portion and a fourth end portion opposite to each other; the first end portion and the third end portion are rotatably connected; the second end portion and the fourth end portion are capable of being opened and closed relative to each other, and collectively enclosing to define a clamping hole in condition of the second end portion and the fourth end portion being closed relative to each other;
the turning handle is rotatably connected to the second end portion to have a locked state and an unlocked state;
the locking portion is capable of being coupled and linked with the turning handle; in the locked state, the locking portion and the turning handle act together to cause the second end portion and the fourth end portion to be pressed against each other to achieve closure;
in the unlocked state, the second end portion and the fourth end portion are capable of being opened relative to each other.

10. The support device according to claim 9, wherein the turning handle comprises a connection rod and a handholding portion; an end of the connection rod is rotatably connected to the second end portion, the other end of the connection rod is arranged with an external thread to be screwed with the handholding portion, and the locking portion is movably sleeved on the connection rod and located between the second end portion and the handholding portion; a side of the fourth end portion defines an avoidance notch;
in the locked state, the connection rod is placed in the avoidance notch, and the handholding portion presses the locking portion against the side of the fourth end portion away from the first clamp member.

11. The support device according to claim 10, wherein the handholding portion comprises a handle and a screwing rod, the screwing rod defining a screwing hole to be screwed to the connection rod, and an axial direction of the screwing hole intersecting with a lengthwise direction of the screwing rod; the handle comprises an eccentric cam, the eccentric cam being rotatably connected to the screwing rod to be able to press the locking portion when rotated until the locking portion abuts against the side of the fourth end portion away from the first clamp member; or
the handholding portion is capable of being moved in a lengthwise direction of the connection rod to adjust a distance between the locking portion and the fourth end portion.

12. The support device according to claim 9, wherein the locking portion is rotatably connected to the turning handle, and a rotation axis of the locking portion and the turning handle is parallel to a rotation axis of the turning handle and the second end portion;
the fourth end portion is arranged with a first snap portion, and the locking portion is arranged with a second snap portion; in the locked state, the second snap portion is snapped to the first snap portion;
one of the first snap portion and the second snap portion is a slot, and the other of the first snap portion and the second snap portion is a protrusion; or, both the first snap portion and the second snap portion are protrusions.

13. The support device according to claim 9, wherein the locking portion is rotatably connected to the fourth end portion, and a rotation axis of the locking portion and the fourth end portion is parallel to a rotation axis of the turning handle and the second end portion;

the turning handle is arranged with a third snap portion, and the locking portion is arranged with a fourth snap portion; in the locked state, the third snap portion is snapped to the fourth snap portion, and the locking portion is stretched;

one of the third snap portion and the fourth snap portion is a slot, and the other of the third snap portion and the fourth snap portion is a protrusion; or, both the third snap portion and the fourth snap portion are protrusions.

14. The support device according to claim 1, wherein a thimble is arranged at an upper end of the support rod.

15. An outdoor appliance, comprising:

a cover portion; and a support device, comprising:

a support rod, comprising a plurality of sleeve rods disposed sequentially in a top-to-bottom direction; wherein for each adjacent two of the plurality of sleeve rods, an end portion of one of the adjacent two is configured to be socked and mated with an end portion of the other of the adjacent two; a peripheral wall of one of the plurality of sleeve rods located at a bottom defines an avoidance hole and a socket hole;

a pedal member, configured to be socked and mated with the socket hole and protruding from the peripheral wall of the one of the plurality of sleeve rods located at the bottom; and an elastic rope, disposed within the one of the plurality of sleeve rods located at the bottom, and sequentially threaded through some of the plurality of sleeve rods; wherein a lower end of the elastic rope is threaded out of the avoidance hole and fixed to the pedal member, and an upper end of the elastic rope is connected to another of the some of the plurality of sleeve rods;

wherein an upper end of the support rod is supported on the cover portion, and a lower end of the support rod is configured to support on the ground.

16. An outdoor appliance, comprising:

a cover portion;

a cross-rod, extending along a transverse direction and supported on a bottom surface of the cover portion; and the support device according to claim 9; wherein the cross-rod passes through the clamping hole.

* * * * *